(No Model.)
W. THAU.
TOOL HOLDER FOR BORING AND SHAPING MACHINES.
No. 603,748. Patented May 10, 1898.
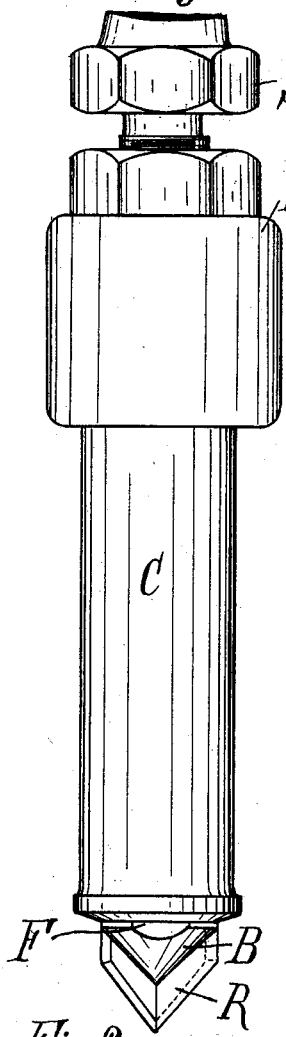
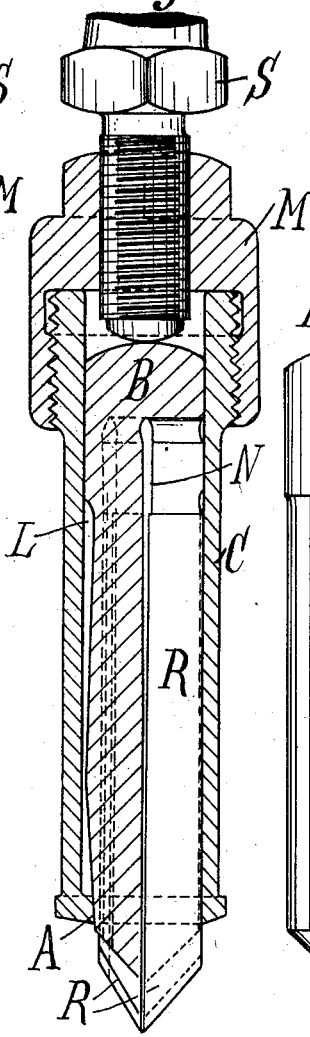
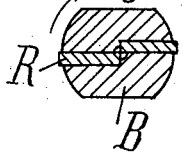
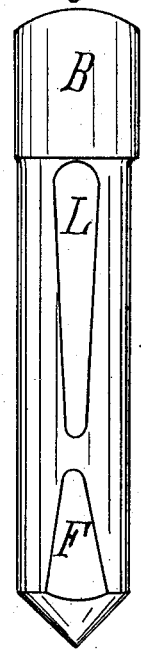
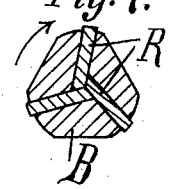
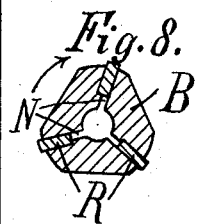
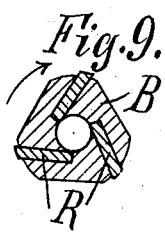
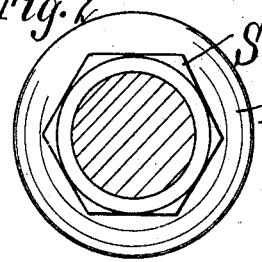
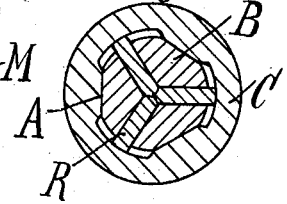
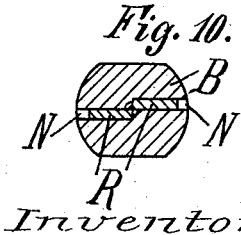
Witnesses:
E. B. Bolton
O. H. Munn
Inventor:
William Thau
By Richard S. ——
his Attorneys.

UNITED STATES PATENT OFFICE.

WILLIAM THAU, OF GNADENFELD, GERMANY.

TOOL-HOLDER FOR BORING AND SHAPING MACHINES.

SPECIFICATION forming part of Letters Patent No. 603,748, dated May 10, 1898.

Application filed August 19, 1897. Serial No. 648,773. (No model.)

*To all whom it may concern:*

Be it known that I, WILLIAM THAU, engineer, a subject of the King of Prussia, Emperor of Germany, residing at Gnadenfeld, in the Province of Silesia, Germany, have invented a new and useful Improvement in Tool-Holders for Boring and Shaping Machines, of which the following is a specification.

The subject-matter of this invention relates to improvements in tool-holders for boring and shaping machines, illustrated by the accompanying drawings as follows: Figure 1 in an elevation, Fig. 2 in a plan view, and Fig. 3 in a vertical and Fig. 4 in a horizontal section, of the improved tool-holder. Fig. 5 represents an elevation of the cutter-bearer, and Figs. 6 to 10 show a plurality of cross-sections of the tool-holder with differently-disposed cutters.

In the improved tool-holders the turning power of the machine is first of all transmitted to screw S, which penetrates through the nut M, closing the upper end of cylinder C, which contains the cutter-bearer B, and so acts against the head of the latter. The cutter-bearer is divided into a plurality of spring-acting branches by a number of grooves N being in connection with each other. Those spring-acting branches are to keep the cutters R between themselves. In order to secure the cutters surely to the bearer, the latter is provided on the lower part of its surface with tapered faces F, resting against correspondingly-shaped inner guide-faces A on the lower end of cylinder C in such a manner that when screw S is tightened the spring-acting branches of bearer B are firmly pressed together, thus fixing the cutters immovably in the grooves N. The tapered faces prevent the cutter-bearer from turning in cylinder C. Hereby the turning power of the boring-machine or breast-drill is transmitted to screw S, nut M, and cylinder C, while upon cutter-bearer B there is merely exerted a pressure in order to prevent it, as above said, from turning in cylinder C and for securing the cutters. The upper part of the spring-acting branches of the cutter-bearer is weakened by faces L in order to increase the elasticity of those branches.

As may be seen from Figs. 6 to 10, number, arrangement, and breadth of the cutters may be varied to suit the work to be done.

Having now particularly described and ascertained the nature of my said invention and in what manner the same is to be performed, I declare that what I claim is—

In a boring-tool, the shank B having longitudinal grooves communicating with each other to form elastic sides, the cutters in said grooves, the casing C having the bearings or guides A at the end the said shank B having the tapered guide-surfaces F engaging the guides A, and having also the weakening-faces L extending longitudinally of the shank B, the said casing being substantially cylindrical and the said guides A being formed by inwardly-extending projections at the end of the cylinder, substantially as described.

In witness whereof I have hereunto signed my name in the presence of two subscribing witnesses.

WILLIAM THAU.

Witnesses:
 MAX BECKER,
 ERNST KATZ.